E. E. MILNER AND W. J. LYTLE.
GLASS ANNEALING LEER.
APPLICATION FILED AUG. 1, 1919.

1,361,604.

Patented Dec. 7, 1920.
8 SHEETS—SHEET 1.

WITNESS
R. H. Balderson

INVENTORS
E. E. Milner
Wm. J. Lytle
Bakewell, Byrnes & Parmelee
their Attys.

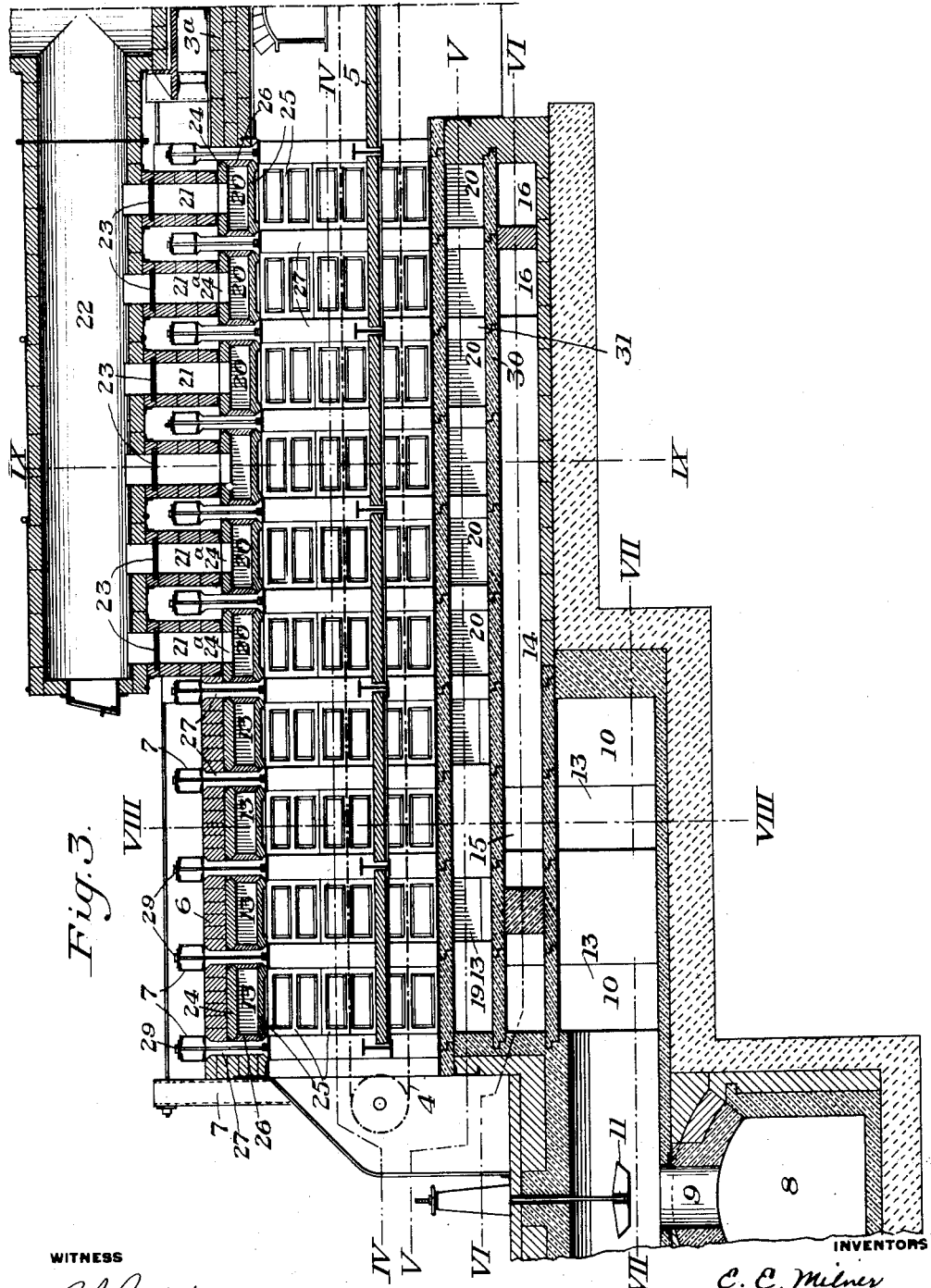

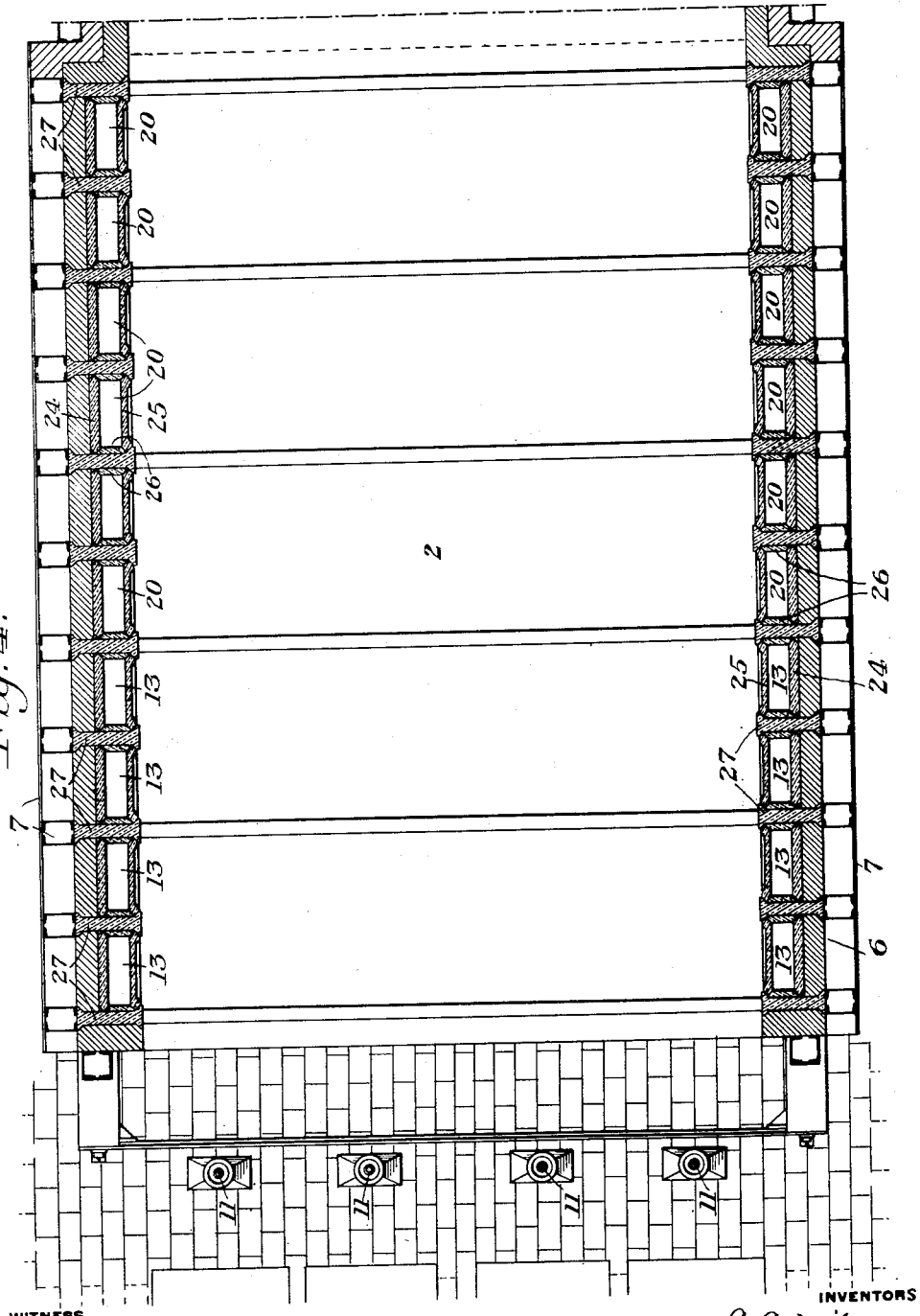

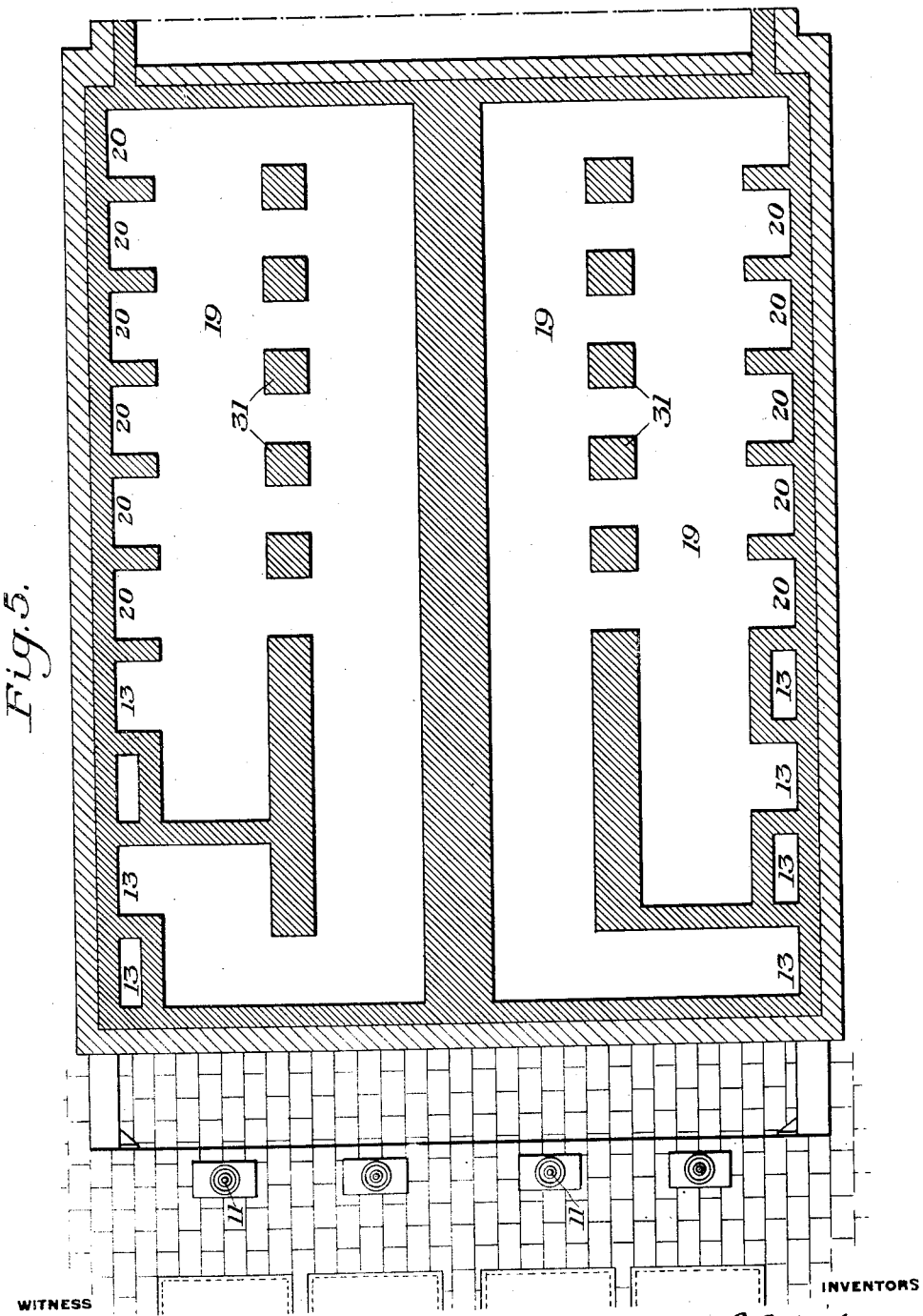

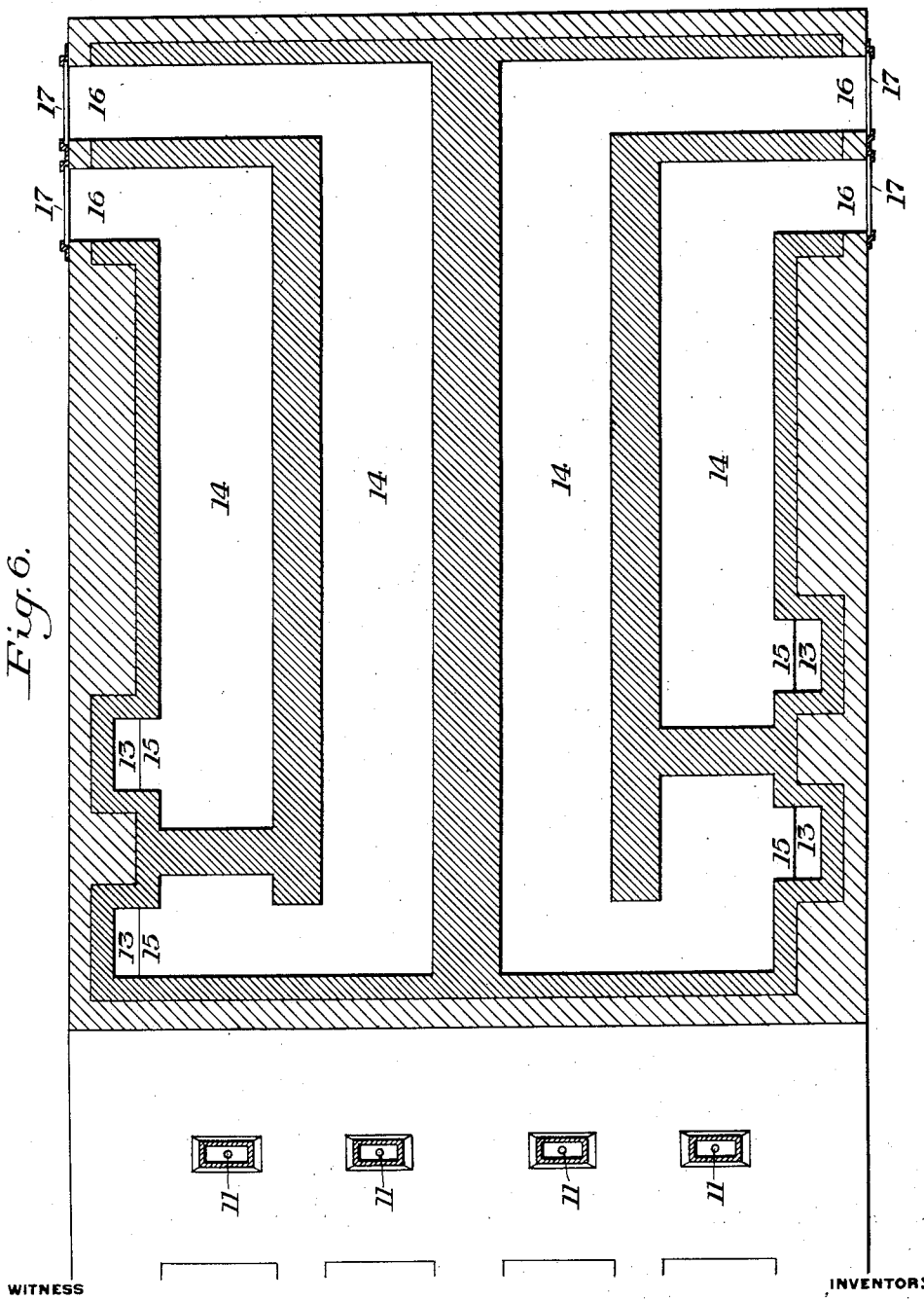

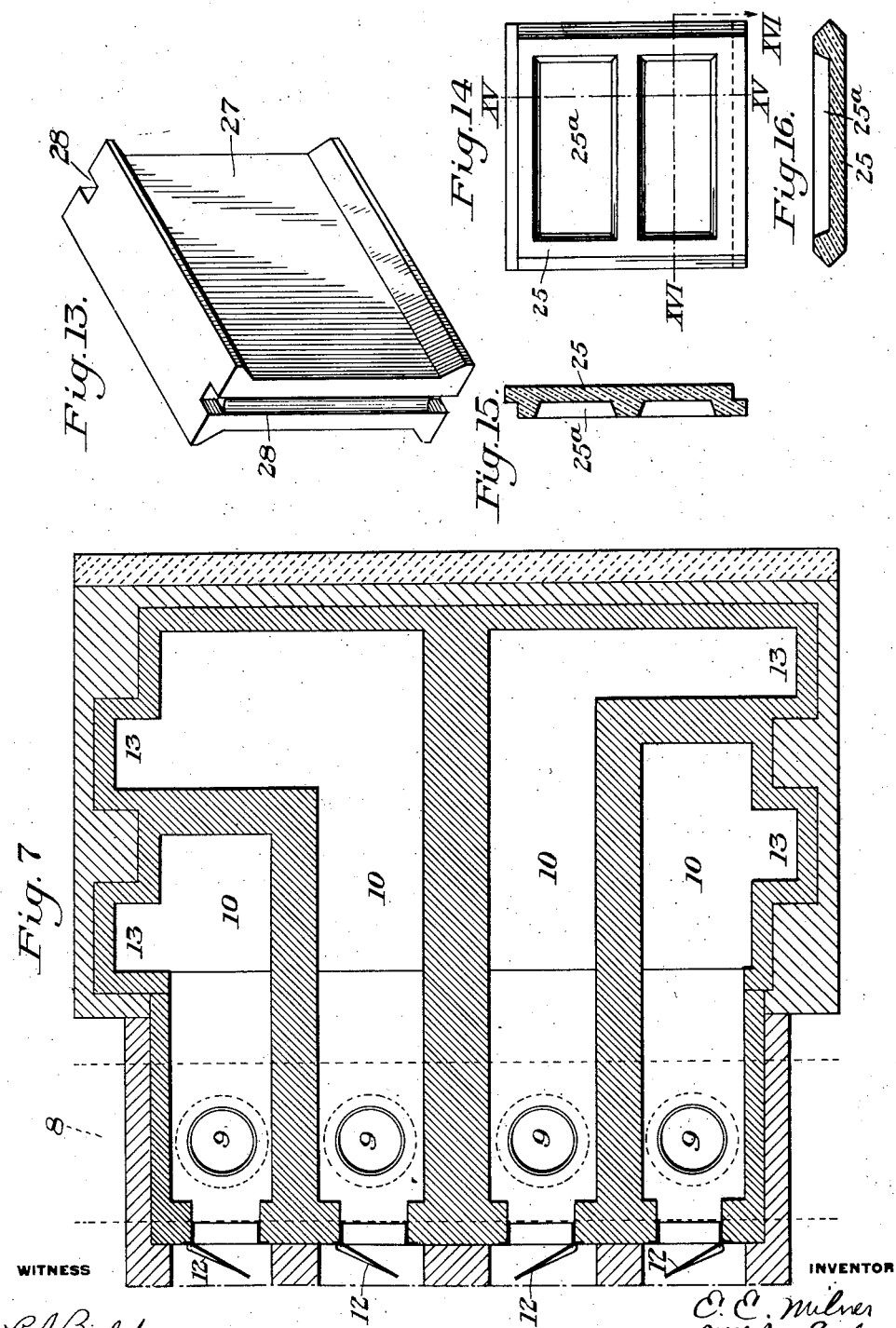

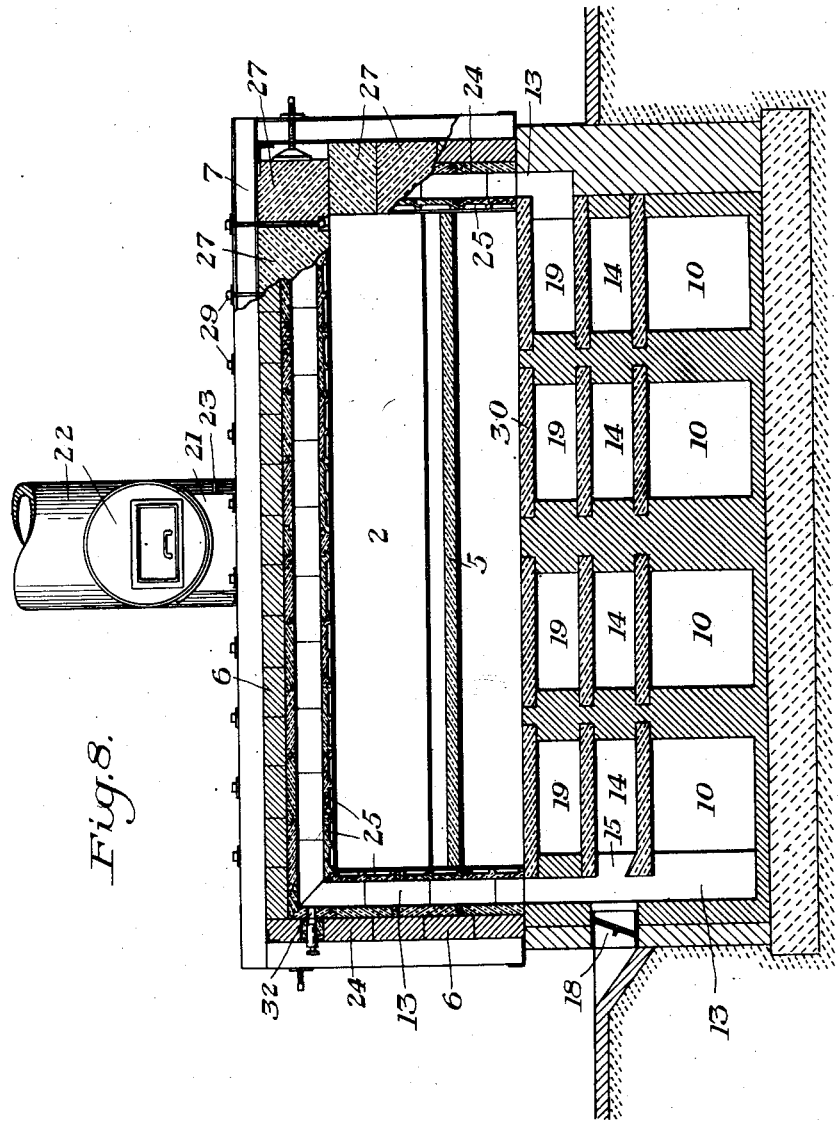

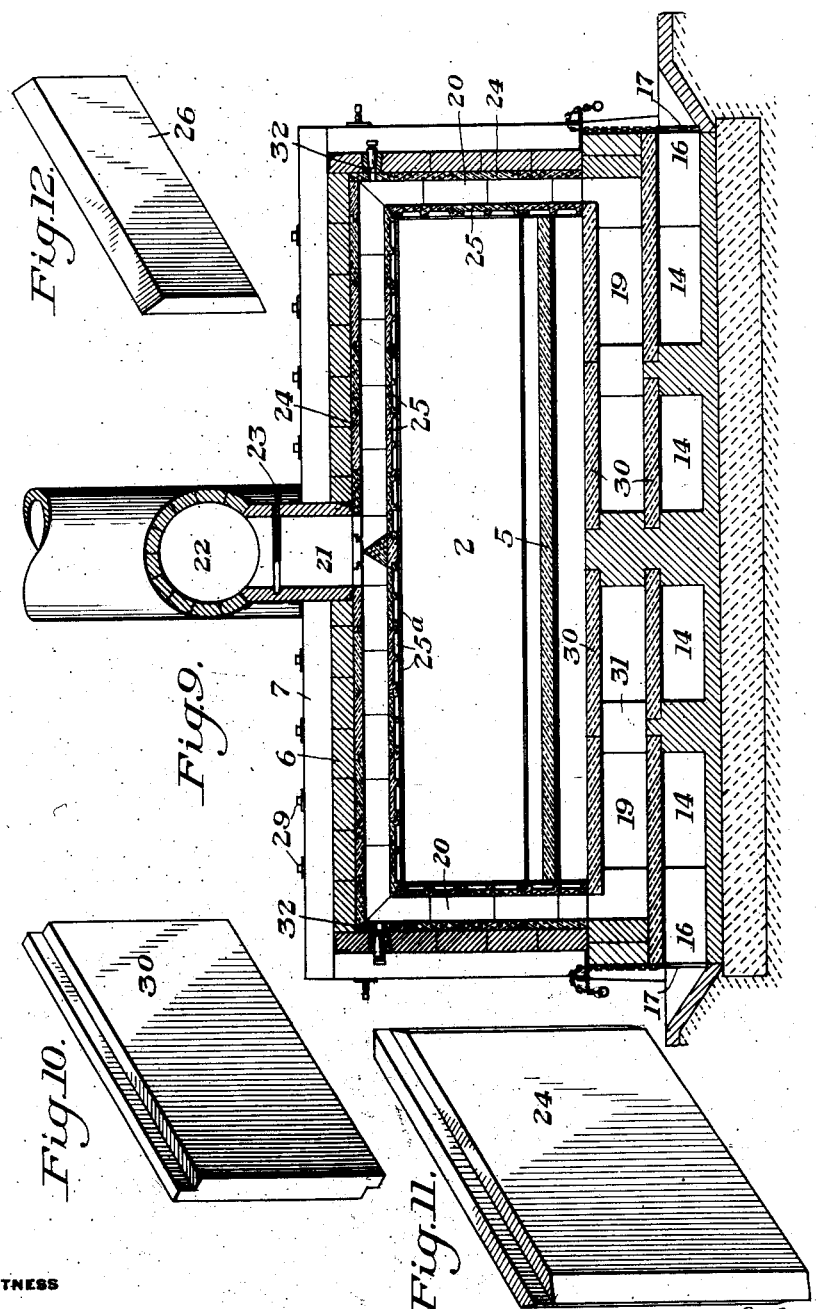

UNITED STATES PATENT OFFICE.

EDWIN E. MILNER, OF SCOTT TOWNSHIP, ALLEGHENY COUNTY, AND WILLIAM J. LYTLE, OF ROSSLYN FARMS BOROUGH, PENNSYLVANIA, ASSIGNORS TO H. L. DIXON COMPANY, OF CARNEGIE, PENNSYLVANIA, A CORPORATION OF PENNSYLVANIA.

GLASS-ANNEALING LEER.

1,361,604.   Specification of Letters Patent.   Patented Dec. 7, 1920.

Application filed August 1, 1919. Serial No. 314,615.

*To all whom it may concern:*

Be it known that we, EDWIN E. MILNER, residing at Scott township, and WILLIAM J. LYTLE, residing at Rosslyn Farms borough, Allegheny county, Pennsylvania, have invented a new and useful Improvement in Glass-Annealing Leers, of which the following is a full, clear, and exact description, reference being had to the accompanying drawings, forming part of this specification, in which—

Fig. 3 is a longitudinal vertical section of one end portion of the leer;

Figs. 4, 5, 6, 7, 8 and 9 are sections taken, respectively, on the lines IV—IV, V—V, VI—VI, VII—VII, VII—VIII and IX—IX of Fig. 3;

Figure 1:
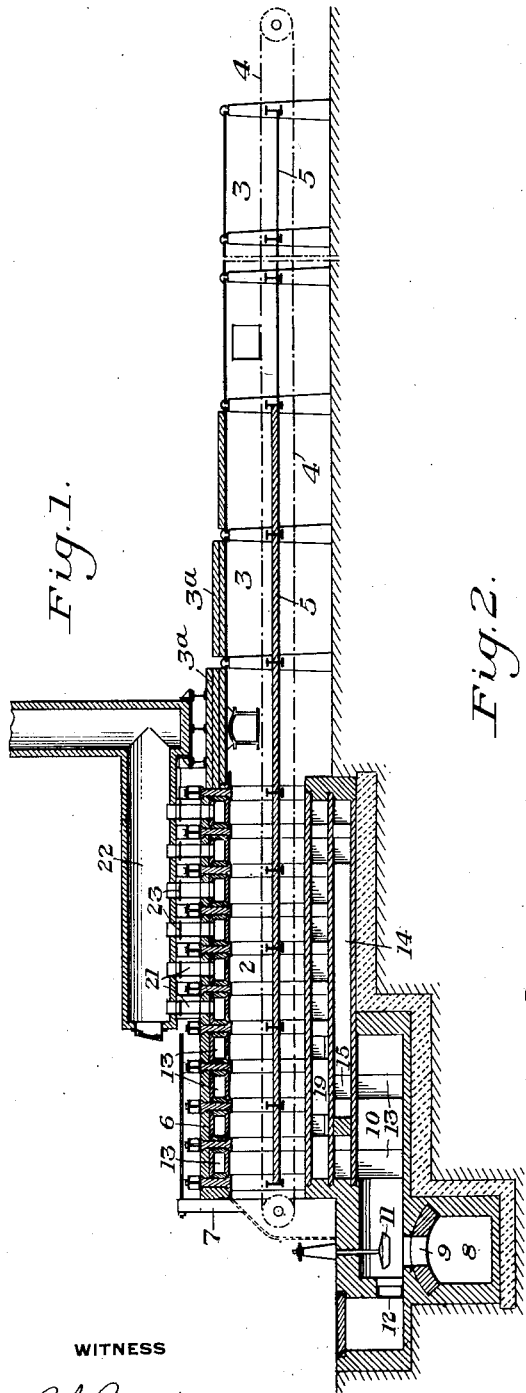
Figure 1 is a longitudinal vertical section of one form of annealing leer embodying our invention.
Figure 2:
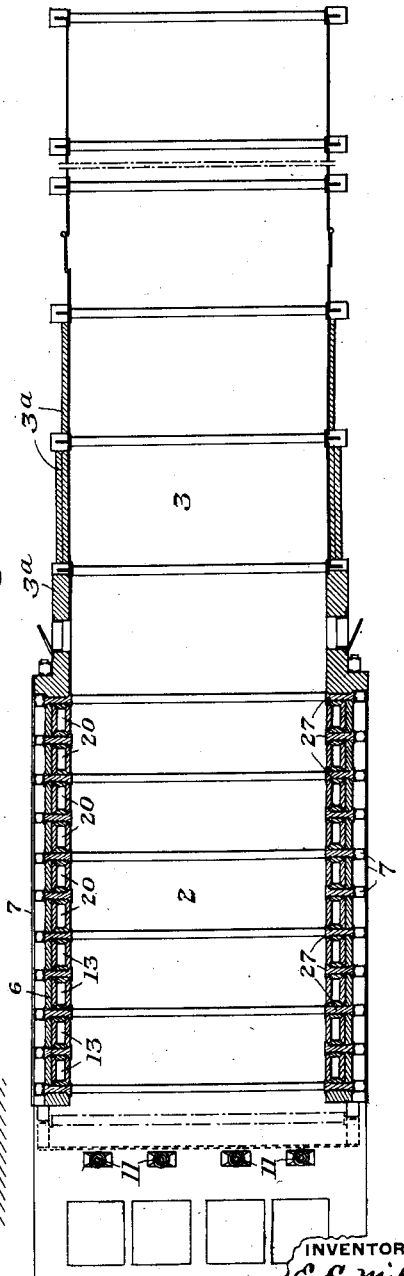
Fig. 2 is a horizontal section of the same.

Figs. 10, 11, and 12 and 13 are perspective views of different forms of tiles used in the leer construction;

Fig. 14 is a plan view of another form of tile; and

Figs. 15 and 16 are sectional views taken on the lines XV—XV and XVI—XVI, respectively, of Fig. 14.

Our invention has relation to annealing leers or furnaces of the type which is especially adapted for the annealing of glassware, and which is further of the muffle type in which the products of combustion or flame do not come into direct contact with the ware, the ware being annealed by the action of heat which passes through the flue walls.

One object of our invention is to provide a leer of this character with an improved flue arrangement for distributing and circulating the heating medium around the annealing chamber, whereby a substantially uniform annealing heat may be obtained within said chamber at any given cross section thereof, while the heat at different portions of said chamber may be regulated and controlled effectively as may be desired.

A further object of our invention is to provide a novel construction of the circulating flues, whereby repairs may be readily made to any flue.

Further objects and advantages of our invention will hereinafter appear.

In the accompanying drawings, the numeral 2 designates the leer chamber proper in which the annealing takes place, and 3 the tunnel continuation thereof in which the annealed glassware is properly cooled down before removal. 4 (Fig. 1) designates any usual type of conveyer by which the articles may be moved through the leer and tunnel. 5 is a baffle which is placed intermediate the upper and lower runs of the conveyer in the leer chamber and throughout the tunnel.

The general framework of the leer is constructed in any usual or suitable manner, being generally made of brickwork 6, reinforced by metallic frame members 7.

Where producer gas is to be used as fuel, this gas is brought in through tunnel 8 (see Fig. 3) which has a plurality of openings 9, leading upwardly into a series of longitudinal flues 10, forming the base of the furnace. Each of these openings is controlled by a suitable damper valve 11 whereby the admission of gas into each of the flues 10 may be properly controlled. Each of the flues 10 is also provided (see Fig. 7) with a clean-out door 12, for permitting cleaning or burning out the flues. Each of the longitudinal flues 10 has a vertical flue 13, leading upwardly therefrom, the flues 10 being so shaped as to bring these flues 13 at the side walls, there being two such flues at each side of the leer, as is clearly shown in Fig. 7. These flues 13 constitute the main heating flues for the receiving end of the leer. Each of them extends upwardly and around the leer chamber, one of these flues being best shown in Fig. 8. These flues are so arranged that the two of them at one side alternate with the two at the opposite side, with the result that the products of combustion in these flues flow around the leer chamber in opposite directions. In this manner, this portion of the chamber has a substantially uniform heat, since at each side there are two flues carrying the hotter gases, while the other two flues at each side carry the gases after they are cooled down somewhat.

Preheated air is supplied to the flues 13 from the longitudinal flues 14, which are formed immediately above the flues 10. There are four of these flues 14, each of which has an opening 15, communicating with one of the flues 13, as best shown in Figs. 6 and 8. Each of the flues 14 has an independent air inlet 16, controlled by a suitable damper 17, whereby the admission of air to each of the flues can be independently controlled. Inasmuch as the entire base of the furnace becomes heated by the products of combustion flowing through the different circulating flues, as will hereinafter more fully appear, the air in these flues 14 will be preheated to a considerable extent before uniting with the gas at the points of combustion.

If the furnace is to be operated by natural gas, this may be introduced into the flues 13 by any suitable means, such as the doors 18, one of which is shown in Fig. 8. Of course, the leer may be initially constructed for use with natural gas, in which case the lower flues 10 will not be required.

The return from each flue 13 is into a chamber 19. There are two of these chambers located immediately above the flues 14, each chamber receiving the return circulation from the two flues 13, which return at that side. The arrangement of these chambers or flues 19 will be best understood by reference to Figs. 5 and 8. Each of these chambers 19 has a plurality of lateral vertical flues 20, leading upwardly therefrom and around the leer chamber back of the flues 13. The arrangement of these flues will clearly appear from Figs. 3, 4 and 9. The hot gases in the chambers 19 will therefore flow upwardly through the flues 20, into flues from opposite sides, meeting over the central top portion of the leer chamber, where they discharge into an offtake flue 21, leading to the stack flue 22. As will be seen from Figs. 1 and 3, there is a separate offtake flue 21 for each of the flues 20. Each of these offtake flues is provided with its own controlling damper 23 (see Fig. 9). In this manner, the circulation through the individual flues 20 can be separately controlled and the temperature within this portion of the leer chamber accurately regulated and controlled. The stack flue 22 is common to all the offtake flues 21.

It will be observed that the inner walls of the flues 13 and 20 form a practically continuous heating surface for the leer chamber. It is frequently of importance to be able to repair or rebuild a portion of one of these flues without dismantling the leer. In order to enable this to be readily accomplished, we prefer to construct these flues 13 and 20 in the following manner: The outer wall of each of these flues is composed of a series of slabs, blocks or tiles 24, one of which is shown in detail in Fig. 11, while the inner wall of each of these flues consists of a series of tiles or slabs, such as shown at 25 in Figs. 14, 15 and 16. The end walls are composed of tiles or slabs shown at 26 (see Fig. 12). These tiles or slabs preferably have beveled edges, as indicated, so as to make miter joints. The slabs or tiles 25 forming the inner walls of the flues are preferably paneled on their inner surface, as shown at $25^a$, thereby reducing their thickness and increasing their heat transmission therethrough. The outer wall tiles or slabs 24 at the center of the flues 20 are formed with openings $24^a$ therethrough, which communicate with the offtake flues 21. These flue-forming tiles are held in place by the key tiles 27, one of which is shown in detail in Fig. 13. These tiles are of I-beam form in cross section. At the sides of the leer, these simply extend through the outer brick walls, and the flanges at their inner ends engage the flanges of the inner wall-forming tiles in the manner clearly shown in Figs. 3 and 4. The end-forming tiles 26 abut the web portions of the key-blocks. At the roof or arch portion of the leer, the keyblocks are provided with vertical recesses 28, at their ends, through which extend hanger bolts 29, these bolts being secured in the adjacent frame channel members 7. In this manner, the arch portions of the flues are suspended from the roof and are securely held in place. At the same time, in case of necessity, any particular title of any particular flue can be readily reached for repairs or replacement, without dismantling the entire leer.

We also preferably form the floor walls of the several flues in the base of the furnace of slab or tile members 30 one of which is shown in detail in Fig. 10. These have interfitted rabbeted edges, and are supported therein on the partition walls of the flues or on columns 31 in said flues.

32 designates poke holes in the flues 13 and 20, in which a suitable poker may be introduced for the purpose of poking out the flues when necessary.

The temperature in the tunnel portion 3 of the leer may be regulated to a considerable extent by progressively decreasing the thickness of the covering or insulation $3^a$. Thus, as shown in Fig. 1, this insulation is thickest adjacent to the rear end of the leer chamber proper and progressively decreases in thickness.

The arrangement shown in the drawings is illustrative only and may be varied according to the temperatures which it is desired to maintain in different portions of the tunnel.

The advantages of our invention will be readily understood by those familiar with glass-annealing leers. It provides a leer in which the products of combustion are kept entirely out of contact with the glassware being annealed; in which practically uniform quiescent heat conditions can be maintained in any given cross section of the leer proper, owing to the manner in which the heating medium is distributed and controlled in the individual flues, and which provides a construction which can be readily built and which greatly facilitates repairs with a minimum loss of time.

We claim:

1. An annealing furnace comprising a plurality of groups of chamber heating flues surrounding the major portion of the annealing chamber in which the articles are to be annealed, one group of said chamber heating flues having means for circulating a heating medium therethrough in opposite directions in adjacent flues, and another group of said chamber heating flues having means for circulating a heating medium upwardly in the same direction in adjacent flues at opposite sides of the annealing chamber, substantially as described.

2. An annealing furnace comprising a plurality of groups of chamber heating flues surrounding the major portion of the annealing chamber in which the articles are to be annealed, one group of said chamber heating flues having means for circulating a heating medium through adjacent flues in opposite directions, flues or chambers into which the return sides of the first named flues discharge, and another group of said chamber heating flues leading upwardly at the side of and above the rear portion of said annealing chamber and arranged to pass the heating medium discharged by the first named flues, substantially as described.

3. An annealing furnace comprising a plurality of groups of chamber heating flues surrounding the major portion of the annealing furnace in which the articles are to be annealed, one group of said chamber heating flues having means for circulating a heating medium through adjacent of said flues in opposite directions, flues or chambers into which the return sides of the first named flues discharge, and another of said groups of chamber heating flues leading upwardly at the side of and above the rear portion of said chamber and arranged to pass the heating medium discharged by the first named flues. the last named flues having individual offtakes, each of which is provided with controlling means whereby the drafts in each flue may be separably controlled, substantially as described.

4. An annealing furnace having a group of chamber heating flues extending upwardly at the sides of and over the receiving portion of the annealing chamber, means for delivering air and fuel independently into each of said flues, flues or chambers located at the base of the furnace and into which said flues discharge at their return ends, and another group of chamber heating flues extending upwardly at the sides and over the top of the rear portion of the annealing chamber and arranged to pass the products of combustion delivered to the flues or chambers in the base of the furnace by the first named group of flues, substantially as described.

5. An annealing furnace having a group of chamber heating flues extending upwardly at the sides of and over the receiving portion of the annealing chamber, means for delivering air and fuel independently into each of said flues, flues or chambers located in the base of the furnace and into which the flues of said group discharge at their return ends, and another group of chamber heating flues extending upwardly at the sides and over the top of the rear portion of the annealing chamber and arranged to pass the products of combustion delivered to the flues or chambers in the base of the furnace by the first group of flues, together with means for independently controlling the flues of the last named group, substantially as described.

6. An annealing furnace comprising a series of flues extending upwardly and over the receiving portion of the annealing chamber, means for passing the products of combustion through adjacent flues in different directions, a separate air-preheating means for each of said first named flues, chambers into which said flues discharge at their return ends, a plurality of other flues extending upwardly from said chambers at opposite sides of the furnace, each pair of said other flues connecting at the top of the furnace with an offtake, and means for separately controlling each of the offtakes, substantially as described.

7. An annealing furnace, comprising a series of circulating flues surrounding the sides and upper portion of the annealing chamber, some of said flues having means for passing a heating medium through adjacent flues in opposite directions, a separate gas inlet chamber for each of the said circulating flues, a separate air-preheating flue for each of said circulating flues, a chamber into which each set of circulating flues discharges at its return end, and a plurality of other circulating flues extending upwardly from the last named chamber at the sides of and over the rear portion of the annealing chamber, together with means for independently controlling the last named flues, substantially as described.

8. An annealing furnace having a plurality of gas inlet flues in its base, a plurality of air-preheating flues above the gas inlet flues, a plurality of chambers above the air-preheating flues and between said flues and the bottom of the annealing chamber of the furnace, vertical flues leading upwardly from the gas inlet flues at the sides of and across the top of the receiving portion of the annealing chamber, each of said vertical flues communicating with one of the air-preheating flues and each of said flues discharging at its return end into one of said chambers, and a plurality of other vertical flues leading upwardly from said chambers at opposite sides of the rear portion of the annealing chamber, and separate offtake flues communicating with each pair of the last named flues, substantially as described.

9. An annealing furnace having a plurality of gas inlet flues in its base, a plurality of air-preheating flues above the gas inlet flues, a plurality of chambers above the air-preheating flues and between said flues and the bottom of the annealing chamber of the furnace, vertical flues leading upwardly from the gas inlet flues at the sides of and across the top of the receiving portion of the annealing chamber, each of said vertical flues communicating with one of the air-preheating flues and each of said flues discharging at its return end into one of said chambers, a plurality of other vertical flues leading upwardly from said chambers at opposite sides of the rear portion of the annealing chamber, and separate offtake flues communicating with each pair of the last named flues, together with separate controlling means for each of said flues, substantially as described.

10. An annealing furnace having a plurality of flues extending upwardly at the sides of and across the top of its annealing chamber, said flues having inner, outer and end walls formed of separate interfitting slab or tile members, and key means supported by the walls of the furnace and securing said flue-forming tiles or slabs, substantially as described.

11. An annealing furnace of the character described, having a heat-circulating flue whose outer, inner and end walls are formed of separate interfitting slab or tile members, and key means carried by the furnace walls and engaging and securing said members, substantially as described.

12. An annealing furnace having a tunnel portion provided with a heat-insulating lagging or covering extending around its upper and side portions, said lagging or covering being of progressively decreasing thickness toward the rear end of the tunnel portion, substantially as described.

In testimony whereof we have hereunto set our hands.

EDWIN E. MILNER.
WILLIAM J. LYTLE